Jan. 12, 1926.                                               1,569,404
C. SMITH
OIL REGULATOR FOR GAS ENGINES
Original Filed Feb. 9, 1923

Clair Smith   INVENTOR.
BY Clem. F. Kimball
ATTORNEY.

Patented Jan. 12, 1926.

1,569,404

UNITED STATES PATENT OFFICE.

CLAIR SMITH, OF COUNCIL BLUFFS, IOWA.

OIL REGULATOR FOR GAS ENGINES.

Application filed February 9, 1923, Serial No. 618,154. Renewed August 17, 1925.

*To all whom it may concern:*

Be it known that I, CLAIR SMITH, a citizen of the United States, residing at Council Bluffs, in the county of Pottawattamie, State of Iowa, have invented a new and useful Oil Regulator for Gas Engines, of which the following is a specification.

My invention relates to improvements in oil regulators for gas engines in which a deflecting plate is interposed in the oil splash and the objects of my improvement are, first, to prevent the cylinders of a gas engine from receiving excessive oil to which they are subjected; second, to distribute the oil to the cylinders receiving a lack of lubrication; and third, to provide a simple and effective means of thus regulating the oil which can be applied in an inexpensive manner to engines already constructed as well as those to be hereafter constructed.

Figure 1:
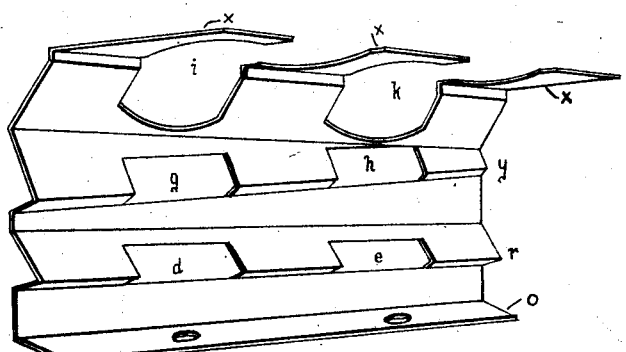
Figure 3:
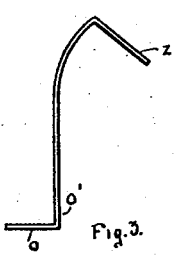
Figure 2:
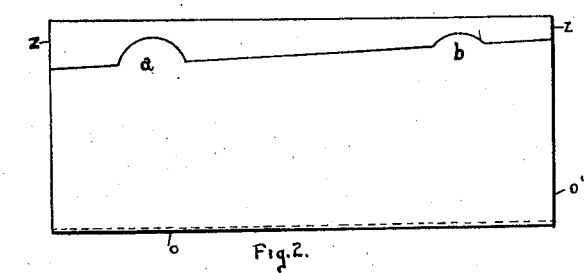
Figure 4:
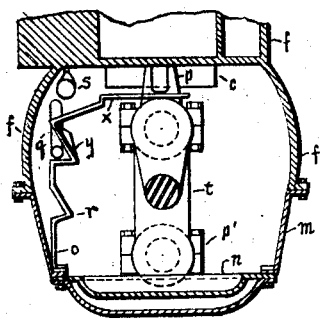
Figure 5:
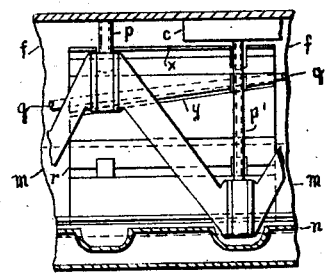

I attain these objects by the structure illustrated in the accompanying drawing, in which Fig. 1 is a general view of the preferred form of my invention. Fig. 2 is the side elevation of another form. Fig. 3 is an end elevation of the form shown in Fig. 2. Fig. 4 is an end elevation of a section of a gas engine showing application of the structure. Fig. 5 is a side elevation and a portion of the working parts of such gas engine showing the regulator in position.

Similar letters refer to similar parts throughout the several views.

In certain types of gas engines, particularly those used in automobiles, using the splash system, an oil pipe $q$ is arranged on the splash side of the crank shaft case extending from the balance wheel to the opposite end of the crank case with a pan $n$, to catch drip and provide a splash of the oiling of the engine, the balance wheel carrying oil from the pan $n$ into the tube $q$. In all of these types of engines the oil is carried through the tube $q$ to the end of the engine opposite the balance wheel which is herein designated as the front of the engine and flows backward in its circuit in the pan $n$ toward the balance wheel on the crank shaft $t$. It is unnecessary to show the balance wheel and construction of this type of gas engine, it being well known to the art. In gas engines of this type there is a superabundance of oil in the forward cylinder or cylinder most remote from the balance wheel, and a relative deficiency of oil in the cylinder nearest the balance wheel. By decreasing the result of the splash caused by the pitmans $p$ and $p'$ in the two forward cylinders, I am able to better distribute the regular supply of oil in the cylinders to prevent excessive carbon in the front cylinders and add to the oiling efficiency of the remaining cylinders. A plate as $o'$ having a varying projection as $z$ is attached on the interior of the crank shaft housing with portions cut away at $a$ and $b$, for the passage of the pitmans $p$ and $p'$, respectively, as they rotate with the crank shaft $t$. The hooded portion $z$ of the plate $o$ is constructed wider at its anterior portion than at its posterior portion.

While the simple plate $o$ shown in Fig. 2 accomplishes the purposes of my invention, I preferably use the form of the invention shown in Fig. 1, in which $o$ is the plate having the extensions or corrugations $r$, $y$, and the extension $x$. The corrugation $y$ is made larger at the anterior portion of the plate and smaller or narrower at the posterior portion of the plate, and the corrugations $y$ is adapted to cover the oil tube $q$ of the gas engine $f$.

An extended portion is provided with perforations for attachment to the proper bolted portions of the engine.

The extension $x$, having the portion $i$ and $k$ cut away to receive the pitmans $p$ and $p'$, respectively, partially covers the first and second cylinders from the front of the gas engine.

Oil from the oil tube $q$ poured from the lower end of said tube $q$ into the front part of the crank shaft case $m$ and the oil pan $n$, is dashed by the pitmans $p$ and $p'$ against the plate $o$. The corrugation $r$ stops a relative amount of this dashed oil at each revolution and the corrugation $y$ likewise returns a part of the oil back to the oil pan $n$, and by reason of the relative slope of the corrugation $y$ from the anterior to the posterior portions of plate $o$, a larger portion of the oil splash is thrown back into the pan $n$ near the front cylinder of the gas engine $f$ than at the second cylinder and by these corrugations $y$ and $r$ the splash is returned to the pan $n$ and thus flows on to the splash pan of the second cylinders. The extension $x$ of the plate serves to hold the remaining splash sufficiently off from the pistons as $c$ to prevent undue oiling of the front or first two cylinders of the engine $f$.

Where the plate $o'$ shown in Figs. 2 and 3 is used the tapered extension $z$ acts in the same manner as the corrugation $y$ of the plate $o$. The plate $o$ or $o'$ is interposed adjacent to the oil pipe $q$ and on the side of the crank shaft case toward which the pitman boxings move when dipping in the oil of the pan $n$.

What I claim and desire to secure by Letters Patent is:

1. In a gas engine of the splash oiler type, a plate located at the splash side of the crank case and extending from the bottom to the top of the same and provided at the lower edge with a horizontal flange extending inwardly and secured to the crank case at the bottom thereof, the top portion of the plate being extended inwardly approximately horizontally over the crank shaft and having openings for the passage of the cranks of the same, said plate being provided between its top and bottom portions with longitudinal angular bends forming shoulders at the inner side of the plate and a groove at the outer side thereof adapted to receive an oil pipe.

2. In a gas engine of the splash oiler type, a plate located at the splash side of the crank case and extending from the bottom to the top of the same and provided at the lower edge with a horizontal flange extending inwardly and secured to the crank case at the bottom thereof, the top portion of the plate being extended inwardly approximately horizontally over the crank shaft and having openings for the passage of the cranks of the same, said plate being provided between the said flange and the top portion with means for intercepting the oil splash and for progressively increasing the effect of the same in the cylinders from front to rear.

3. In a gas engine of the splash oiler type, a plate located at the splash side of the crank case and extending from the bottom to the top of the same and provided at the lower edge with a horizontal flange extending inwardly and secured to the crank case at the bottom thereof, the top portion of the plate being extended inwardly approximately horizontally over the crank shaft and having openings for the passage of the cranks of the same, said plate being provided between the flange and the top portion with longitudinal bends providing interior shoulders and exterior oil pipe receiving groove and including an interior shoulder gradually decreasing in width from the front to the rear to progressively increase the splash effect on the cylinders.

CLAIR SMITH.